(12) United States Patent
DaSilveira (10) Patent No.: US 9,089,106 B2
(45) Date of Patent: Jul. 28, 2015

(54) LIVESTOCK STANCHION

(71) Applicant: John DaSilveira, Madisonville, TX (US)

(72) Inventor: John DaSilveira, Madisonville, TX (US)

( * ) Notice: Subject to any disclaimer, the term of this patent is extended or adjusted under 35 U.S.C. 154(b) by 0 days.

(21) Appl. No.: 14/063,692

(22) Filed: Oct. 25, 2013

(65) Prior Publication Data

US 2015/0164043 A1 Jun. 18, 2015

(51) Int. Cl.
*A01K 15/04* (2006.01)
*A01K 1/06* (2006.01)

(52) U.S. Cl.
CPC .............. *A01K 1/0613* (2013.01); *A01K 1/0606* (2013.01); *A01K 15/04* (2013.01)

(58) Field of Classification Search
CPC ...................................................... A01K 15/04
USPC .................................................. 119/738–750
See application file for complete search history.

(56) References Cited

U.S. PATENT DOCUMENTS

| | | | |
|---|---|---|---|
| 2,315,414 A * | 3/1943 | Germany ....................... 403/331 |
| 3,318,099 A * | 5/1967 | Sugden .......................... 405/153 |
| 4,037,566 A | 7/1977 | Albers |
| 4,185,592 A | 1/1980 | Albers, Sr. |
| 4,377,131 A | 3/1983 | Vandenberg et al. |
| 4,476,815 A | 10/1984 | Albers, Sr. |
| 4,495,897 A | 1/1985 | Albers, Sr. |
| 4,867,105 A | 9/1989 | Hatfield |
| 4,930,452 A | 6/1990 | DaSilveira |
| 5,098,216 A * | 3/1992 | Caperton ....................... 403/341 |
| D326,340 S | 5/1992 | DaSilveira |
| RE34,232 E | 4/1993 | DaSilveira |
| 5,309,869 A | 5/1994 | Albers, Jr. |
| 5,345,973 A * | 9/1994 | Vinciguerra ..................... 139/57 |
| 5,694,887 A * | 12/1997 | Vandenberg ................... 119/740 |
| 5,975,027 A | 11/1999 | DaSilveira |
| 6,217,251 B1 * | 4/2001 | Kato et al. ..................... 403/341 |
| 6,352,052 B1 | 3/2002 | Albers, Jr. |
| 6,776,124 B1 | 8/2004 | Albers, Jr. |
| 6,834,620 B2 | 12/2004 | Albers, Jr. |
| 6,863,031 B1 | 3/2005 | DaSilveira |
| 7,784,431 B2 | 8/2010 | Hatfield et al. |
| 2013/0164079 A1 * | 6/2013 | Edwards ....................... 403/327 |

* cited by examiner

*Primary Examiner* — Joshua Huson
(74) *Attorney, Agent, or Firm* — Royston Rayzor Vickery & Williams L.L.P.; William P. Glenn, Jr.

(57) ABSTRACT

An improved livestock stanchion including a plurality of forked vertical posts fixed between a substantially horizontal base rail and a horizontal rail to form a co-planar frame having at least one livestock opening. The horizontal rail can be serpentine in form to reduce the likelihood of head, horn or ear strikes as the animal's head enters a livestock opening. A locking bar rests in at least one releaseable support yoke mounted to the frame to allow easy installation and removal of a locking bar and its appurtenances. An end lap between adjacent locking bars provides for a strong releaseable couple. An offset pivot member and an offset latch pin of a pivoting restraining stanchion provide early engagement of a latch pin to a latching mechanism such as a pair of opposing latch dogs mounted on a locking bar above the horizontal rail.

20 Claims, 6 Drawing Sheets

LIVESTOCK STANCHION

CROSS-REFERENCES TO RELATED APPLICATIONS

Not Applicable

STATEMENT REGARDING FEDERAL SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING

Not Applicable

BACKGROUND OF INVENTION (1) Field of Invention

The present invention relates generally to livestock stanchions. More particularly, the present invention relates to frames for livestock stanchions that allow easy locking and releasing of animals from a frame as well as ease of livestock stanchion maintenance.

(2) Background of Invention

There exist a number of livestock stanchions that disclose an essentially co-planar frame of vertical and horizontal rails in combination with pivoting restraining stanchions to admit, restrain or manually release the heads of livestock. Typically, an animal is enticed to place its head through the frame to reach food that is typically on the other side of the frame and low to the ground. As the animal lowers its head to reach the food, the neck generally comes into contact with a pivoting restraining stanchion thereby causing it to lock into a vertical position and contain the head of the animal. The head and neck of the animal are free to move up and down but not sideways or backwards. Single and dual pivoting restraining stanchions fixed to a frame can be found in U.S. Pat. No. 7,784,431 issued to Hatfield et al (hereinafter Hatfield '431); U.S. Pat. No. 6,863,031 issued to DaSilveira (hereinafter DaSilveira '031), U.S. Pat. No. 6,834,620 issued to Albers (hereinafter Albers '620), U.S. Pat. No. 6,776,124 issued to Albers (hereinafter Albers '124); U.S. Pat. No. 6,352,052 issued to Albers (hereinafter Albers '052); U.S. Pat. No. 5,975,027 issued to DaSilveira (hereinafter DaSilveira '027), U.S. Pat. No. 5,309,869 issued to Albers (hereinafter Albers '869); U.S. Pat. No. Re 34,232 issued to DaSilveira (hereinafter DaSilveira '232); U.S. Design Pat. No. 326,340 issued to DaSilveira (hereinafter DaSilveira '340); U.S. Pat. No. 4,930,452 issued to DaSilveira (hereinafter DaSilveira '452); U.S. Pat. No. 4,867,105 issued to Hatfield (hereinafter Hatfield '105); U.S. Pat. No. 4,495,897 issued to Albers (hereinafter Albers '897); U.S. Pat. No. 4,476,815 issued to Albers (hereinafter Albers '815); U.S. Pat. No. 4,377,131 issued to Vandenberg et al (hereinafter Vandenberg '131); U.S. Pat. No. 4,185,592 issued to Albers (hereinafter Albers '592); and U.S. Pat. No. 4,037,566 issued to Albers (hereinafter Albers '566).

In the above disclosed patents, securing a pivoting restraining stanchion into a locked position is achieved through the use of a rotating and/or sliding locking bar to operate upon a latching mechanism. Use of a sliding locking bar is disclosed in Albers '592 (See FIG. 1) and Albers '566 (See FIG. 1). Use of a rotating locking bar is disclosed in Hatfield '431 (See FIG. 2), DaSilveira '031 (See FIG. 1), Albers '620 (See FIG. 1), Albers '124 (See FIG. 1), Albers '052 (See FIG. 1), DaSilveira '232 (See FIG. 5), DaSilveira '340 (See FIG. 1), and DaSilveira '452 (See FIG. 5). Use of both a sliding and rotating locking bar is disclosed in DaSilveira '027 (See FIG. 8), Albers '869 (See FIG. 1), Hatfield '105 (See FIG. 1), Albers '897 (See FIG. 1), Albers '815 (See FIG. 1), and Vandenberg '131 (See FIG. 1).

In each of the above described patents, the rotating or sliding locking bar passes through a number of support fittings fixed to the frame. See Albers '592 (FIG. 1—Element 80), Albers '566 (FIGS. 1-58). Hatfield '431 (FIG. 2-22), DaSilveira '031 (FIGS. 9-62), Albers '620 (FIG. 18—Element 71), Albers '124 (FIG. 18—Element 71), Albers '052 (FIG. 1—Element 66), DaSilveira '232 (FIG. 5—Element 26), DaSilveira '340 (FIG. 1), DaSilveira '452 (FIGS. 5-26), DaSilveira '027 (FIG. 1—Element 55), Albers '869 (FIGS. 9-48), Hatfield '105 (FIG. 1—Element 22), Albers '897 (FIG. 1—Element 38), Albers '815 (FIG. 1—Element 38), and Vandenberg '131 (FIG. 2—Element 24). Yet if any one of the locking bars discussed above must be replaced, the full length of the locking bar must be pulled through the support fittings or cut into smaller pieces to remove from the support fittings. However, cutting free the damaged portion from the frame usually renders the locking bar useless or requires welding the locking bar pieces (new and old) in place above the frame rather than on a workbench. Furthermore, none of the above referenced patents provide for a strong but releaseably coupled joint between adjacent locking bars, whether rotating, sliding or a combination of both.

The latching mechanisms used on conjunction with the above described locking bars (and known to those skilled in the art) can be generally characterized as either having a stop pin/latch pin combination or a latch space/latch pin combination. Latching mechanisms with a stop pin/latch pin combination can be arranged where the latch element (stop pin or latch pin) is associated with the locking bar or the upper end region of the restraining stanchion. See Hatfield '105, Albers '897, Albers '815, and Vandenberg '131. Latching mechanisms with a latch space/latch pin combination are depicted in Albers '869, Albers '592, and Albers '566. Regardless of which version is used, the mechanism is limited to arresting movement of the restraining bar in only one direction. Additional stop pins or latch recesses must be added at different locations along the locking bar to arrest movement of the restraining bar in the opposite direction. The spacing between the opposing latches dictates the amount of movement or play when the arresting stanchion is in a "locked" position. A large distance between opposing latches increases the likelihood of an animal injuring itself when the restraining stanchion is in a locked position. Too small a distance between opposing latches, while decreasing the likelihood of an animal injuring itself, interferes with unlocking the latching mechanism.

A pivoting restraining stanchion (disclosed above and known to those skilled in the art) is typically moved from a free position to a locked position by an animal inserting its head into a generally triangular livestock opening defined by the vertical posts of the frame and the restraining stanchion in a free (or open) position. Too small an opening and the ears or horns of an animal will strike the frame and cause the animal to shy away from inserting its head into the livestock opening. The typical livestock stanchion (as depicted in the described references and known to those skilled in the art) increases the distance between adjacent vertical posts to alleviate ear and horn strikes. This is achieved by using straight vertical posts at an optimal spacing distance to avoid ear and/or horn strikes. See Hatfield '431 (FIG. 1), DaSilveira '031 (FIG. 1), DaSilveira '027 (FIG. 1), DaSilveira '232 (FIG. 1), DaSilveira '340 (FIG. 1), and DaSilveira '452 (FIG. 1). While the construction of such frames are easy, the number of livestock openings in a given distance will decrease. Other livestock stanchions increase the size of an upper portion of the livestock opening, by adding bent vertical member. See Albers '620 (FIG. 1), Albers '124 (FIG. 1), Albers '052, Albers '869 (FIG. 1), Hatfield '105 (FIG. 1), Albers '897 (FIG. 1), Albers '815 (FIG. 1), Vandenberg '131 (FIG. 1), Albers '592 (FIG. 1), Albers '566 (FIG. 1). Yet in each of these stanchions, additional vertical members are required, which increase the cost and complexity of a livestock frame.

Once the animal has placed its head through the livestock opening, then typically its neck makes contact with a portion of the pivoting restraining stanchion below the pivot point causing the restraining stanchion to move from an open position to a locked position. To prevent the restraining stanchion from returning to the open position, most livestock stanchions described above (and known to those skilled in the art) the latching mechanism is positioned on the locking bar so that engagement occurs when the restraining stanchion is near vertical. See Hatfield '431 (FIG. 3), DaSilveira '031 (FIG. 1), Albers '620 (FIG. 7), Albers '124 (FIG. 7), Albers '052 (FIG. 11), DaSilveira '027 (FIG. 1), Albers '869 (FIG. 1), DaSilveira '232 (FIG. 1), DaSilveira '340 (FIG. 1), DaSilveira '452 (FIG. 1), Hatfield '105 (FIG. 1), Albers '897 (FIG. 1), Albers '815 (FIG. 1), Vandenberg '131 (FIG. 3), Albers '592 (FIG. 1), Albers '566 (FIG. 1). Yet none provide a means to encourage early engagement before the restraining stanchion is in a near vertical position.

In view of the above described limitations and issues with associated with existing livestock stanchions, the present invention has been developed to alleviate these drawbacks and provide further benefits to the user. These enhancements and benefits are described in greater detail herein below with respect to several alternative embodiments of the present invention.

BRIEF SUMMARY OF THE INVENTION

The present invention in its several disclosed embodiments alleviate the drawbacks and deficiencies described above with respect to conventional livestock stanchions. The present invention incorporates several additionally beneficial features.

The improved stanchion comprises a plurality of forked vertical posts fixed between a substantially horizontal base rail and a horizontal rail to form an essentially co-planar frame with a plurality of livestock openings to simultaneously achieve a sturdy and easily built frame with a minimal number of additionally shaped vertical support members. The improved stanchion may also include a serpentine shaped horizontal rail to increase the size of the livestock openings. A locking bar resting horizontally in at least two releaseable support yokes mounted to the horizontal rail forms a swing space between the locking bar and the horizontal rail. The locking bar rotates about a longitudinal axis parallel to the base rail in at least two releaseable support yokes fixed to the horizontal rail. The releaseable support yokes provide ease of maintenance and removal of the locking bar (in one piece) from the improved stanchion without the need for cutting the locking bar. The locking bar of the improved livestock stanchion may include an end lap to releaseably couple two adjacent locking bars to further improve maintenance and removal of a locking bar. An offset of the pivot point between the forked frame and a pivoting restraining stanchion allows the neck of an animal sticking through a livestock opening to engage the restraining stanchion earlier than on existing pivoting restraining stanchions, thereby improving engagement of the restraining stanchion with the latching dogs fixed to the rotating locking bar. The improved livestock stanchion may further include an offset latching pin at the upper end of a restraining stanchion to improve early engagement of the restraining stanchion with the latching dogs.

It is the general object of the present invention to provide an low cost, easy to construct and maintain animal actuated locking and user activated unlocking livestock stanchion.

It is another object of the present invention to provide an improved livestock stanchion by which individual animals may lock themselves quicker into a frame with minimal horn, ear and head strikes when the latch assembly is in a locked position, but may not lock themselves into a frame when the latch assembly is in an unlocked position.

It is still another object of the present invention to provide an improved livestock stanchion by which a user may safely and simultaneously releases all animals or releases individual animals.

It is still another object of the present invention to provide an improved livestock stanchion that has parts that are easily replaced.

BRIEF DESCRIPTION OF THE SEVERAL VIEWS OF THE DRAWINGS

The invention is described in greater details in the following examples and with reference to the attached drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and function details disclosed herein are not to be interpreted as limiting, but merely as a basis for the claims and a representative basis for teaching one skilled in the art to variously employ in the present invention.

Figure 1:
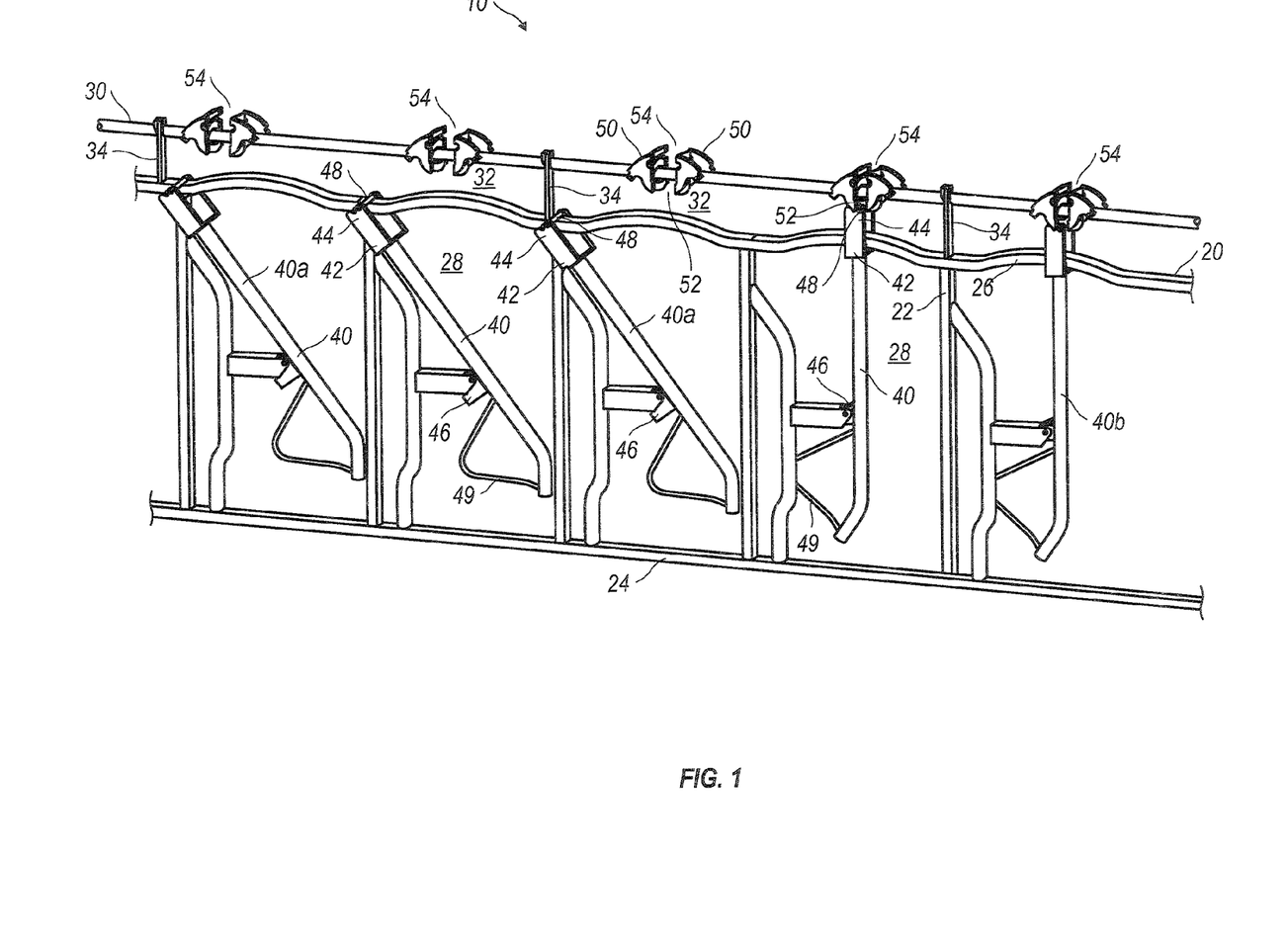
FIG. 1 is an elevation view of an improved livestock stanchion depicting the frame with a serpentine horizontal rail, forked vertical members, offset pivot point for the restraining stanchion and an offset latch pin.

The present invention is directed toward a livestock stanchion 10 with a plurality of forked vertical posts 22 fixed between a substantially horizontal base rail 24 and a horizontal rail 26 to form an essentially co-planar frame 20 having at least one livestock opening 28. See FIGS. 1 and 2. In a preferred embodiment, vertical posts 22 are forked. In such an embodiment, the plurality of forked vertical posts 22 fixed between the horizontal rail 26 and base rail 24 to provide a durable and rigid frame 20. Each forked vertical post 22 comprises a straight tine 222 and a bent tine 224 such that both tines 222 and 224 of each forked vertical post 22 are fixed to the base rail 24 and the furcation between tines 222 and 224 is located at an upper region of a vertical post 22 near horizontal rail 26. See FIGS. 1 and 2. Such an arrangement provides each livestock opening 28 with an upper region that is larger than its lower region. Each tine 222 and 224 serves to strengthen the rigidity of the frame 20 and simultaneously function as a defining member of a livestock opening 28. In short, the novel forked vertical posts 22 eliminate the need for vertical members between livestock openings 28 which only serve to strength the frame 20. Furthermore, the incorporation of a plurality of forked vertical posts 22 in a livestock frame 10 provides at least the same rigidity of traditional frames but without the need for specialized vertical pieces as referenced in Hatfield '431 (FIG. 1—Elements 4 and 4'), Albers '620 (FIG. 1—Elements 44, 46 and 50), Albers '124 (FIG. 1—Elements 44, 46 and 50), Albers '052 (FIG. 1—Elements 30, 38 and 38), Albers '869 (FIG. 1—Elements 10, 18, 16 and 28), Hatfield '105 (FIG. 1—Elements 14, 15 and 16), Albers '897 (FIG. 1—Elements 10, 16 and 28), Albers '815 (FIG. 1—Elements 10, 10a, 16 and 28), Vandenberg '131 (FIG. 1—Elements 6 and 8), Albers '592 (FIG. 1—Elements 10, 16, 18 and 28) and Albers '566 (FIG. 1—Elements 10, 16, 18 and 28).

In a preferred embodiment, the horizontal rail 26 is bowed upward to increase the size of the upper region of a livestock opening 28 thereby eliminating or at least reducing the likelihood of an animal striking its head, horn or ears while passing its head through one of the livestock openings 28. The upward bowing of the horizontal rail 26, at each of the livestock openings 28, results in the horizontal rail 26 taking on a serpentine form. See FIGS. 1 and 2. The serpentine horizontal rail 26 used with a plurality of forked vertical post 22 provides a rigid and durable livestock stanchion with a plurality of larger livestock openings 28 with fewer specialized vertical members that is easy to construct.

Figure 2:
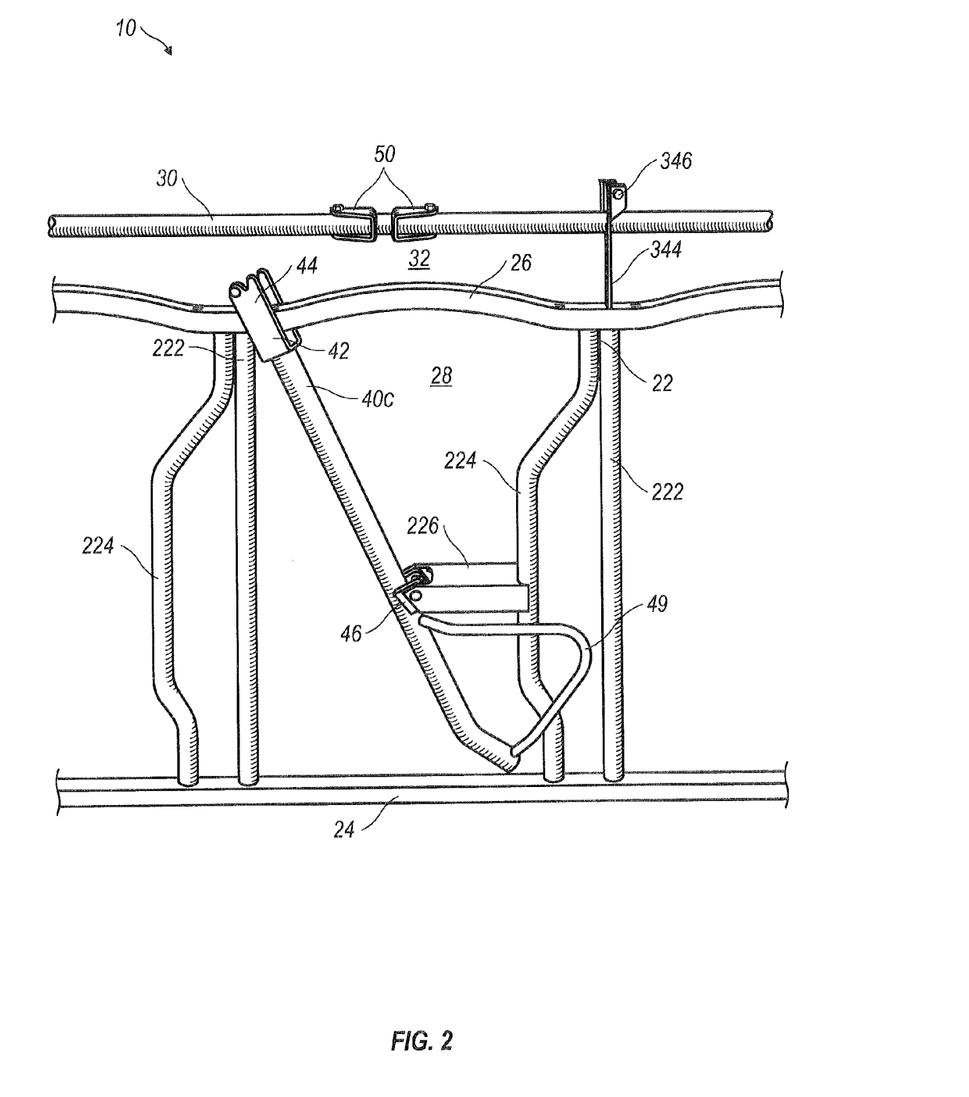
FIG. 2 is an elevation view of an improved livestock stanchion depicting the other side of the frame shown in FIG. 1.
Figure 3:
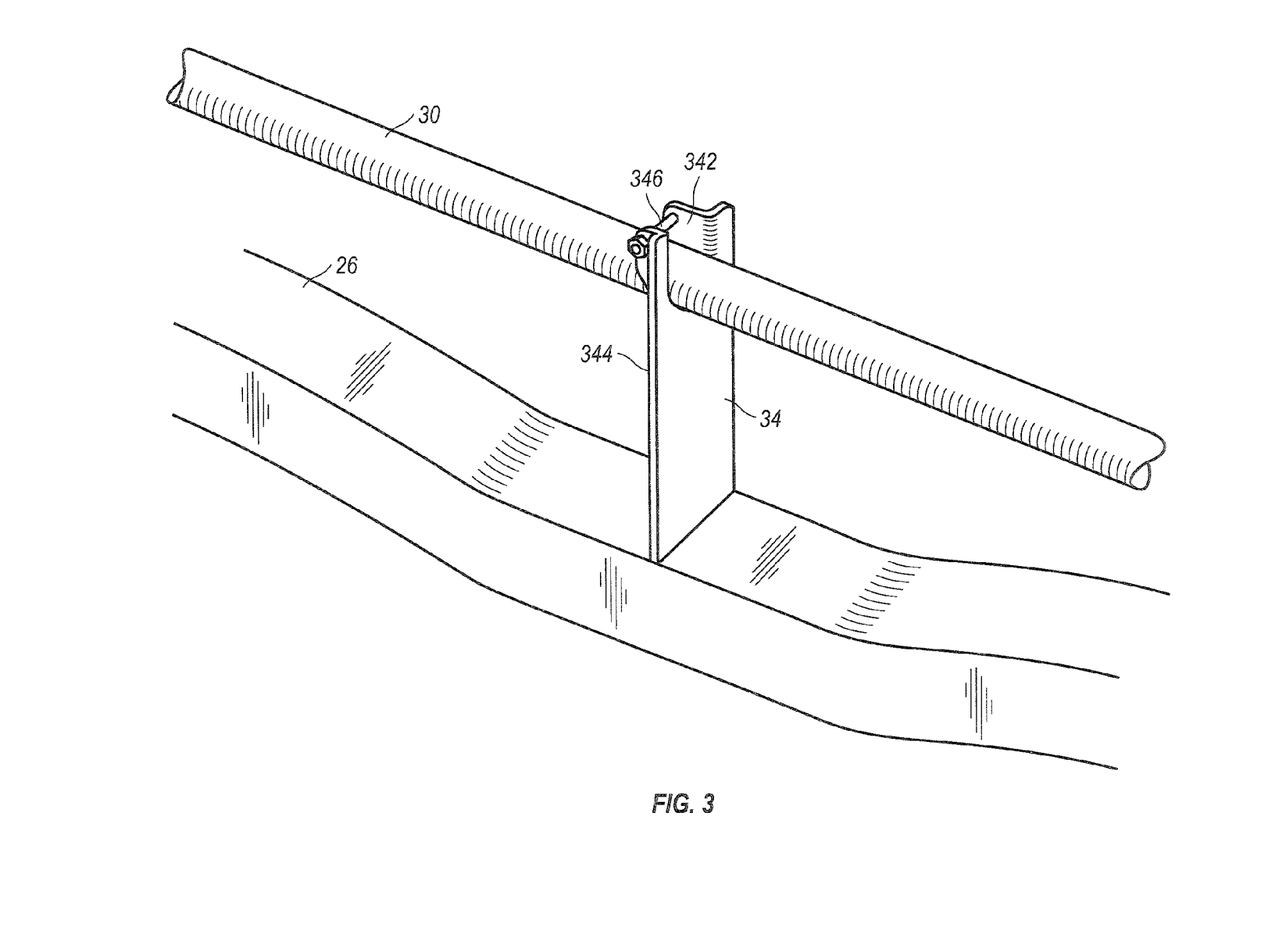
FIG. 3 is a perspective view of an improved livestock stanchion depicting a releasable mounting yoke.

The livestock stanchion of the present invention further comprises a locking bar 30 resting horizontally in at least two releaseable support yokes 34 mounted to the horizontal rail 26 (whether straight or serpentine in form). See FIGS. 1 and 3. The locking bar 30 is positioned above the horizontal rail 26 to form a swing space 32 above the plurality of livestock openings 28. See FIGS. 1 and 3. In a preferred embodiment, at least one support yoke 34 is releasable. See FIG. 3. As depicted in FIGS. 2 and 3, at least one support yoke 34 comprises a mounting member 344 fixed to and projecting upward from the horizontal rail 26. A support space 342 is formed in the upper end of a mounting member 344 and configured to support the locking bar 30 and allow it to rotate freely about a longitudinal axis of the locking bar 30. See FIGS. 2 and 3. In a preferred embodiment, a support yoke 34 further comprises a removable securing pin 346 across the upper region of a support space 342 to prevent dislodging of the locking bar 30. See FIG. 3. Use of at least one support yoke 34 allows a locking bar 30 to be easily inserted into or removed from a livestock stanchion 10 without the need for threading a locking bar 30 through a specific sequence of mounting supports, latching elements, and similar appurtenances or cutting a locking bar 30 (or its mounts) to remove mounting supports, latching elements or similar appurtenances.

Figure 5:
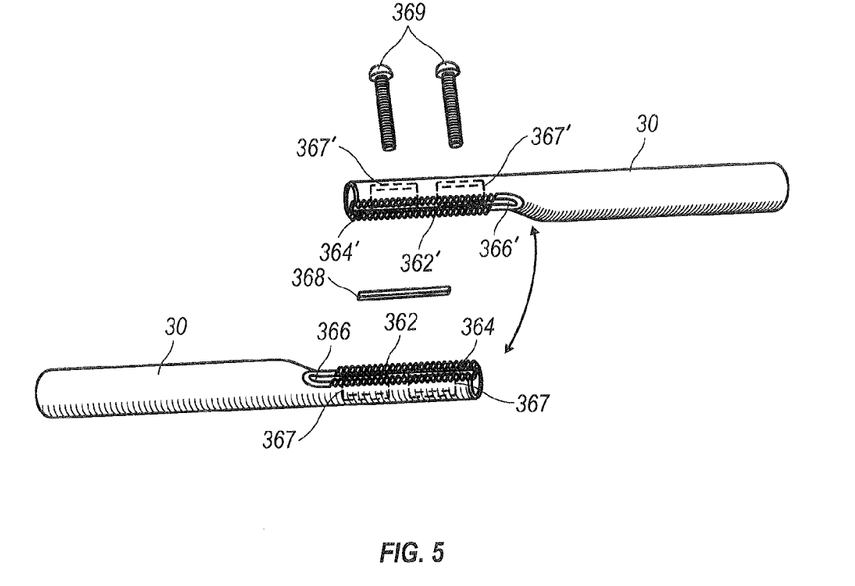
FIG. 5 is an elevation view of an improved livestock stanchion end lap coupling.
Figure 6:
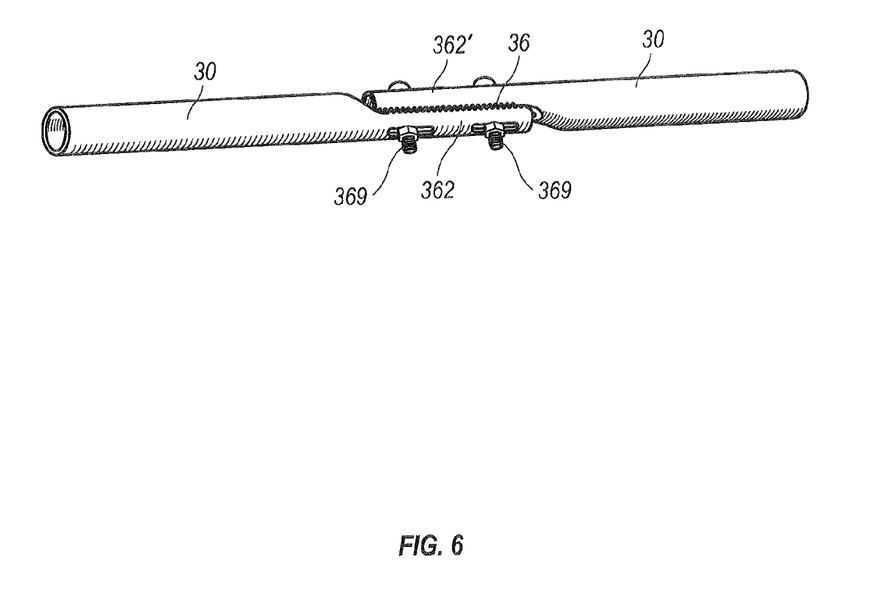
FIG. 6 is an elevation view of an improved livestock stanchion offset latch pin.
Figure 7:
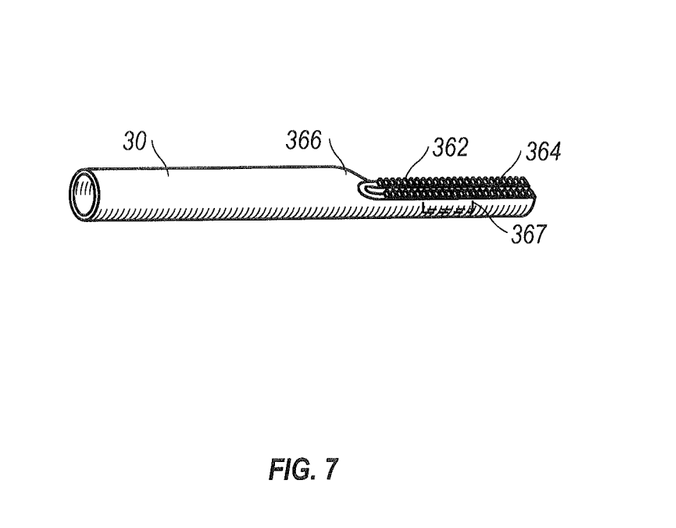
FIG. 7 is a perspective view of one portion of an end lap coupling with an elongated passage.
Figure 8:
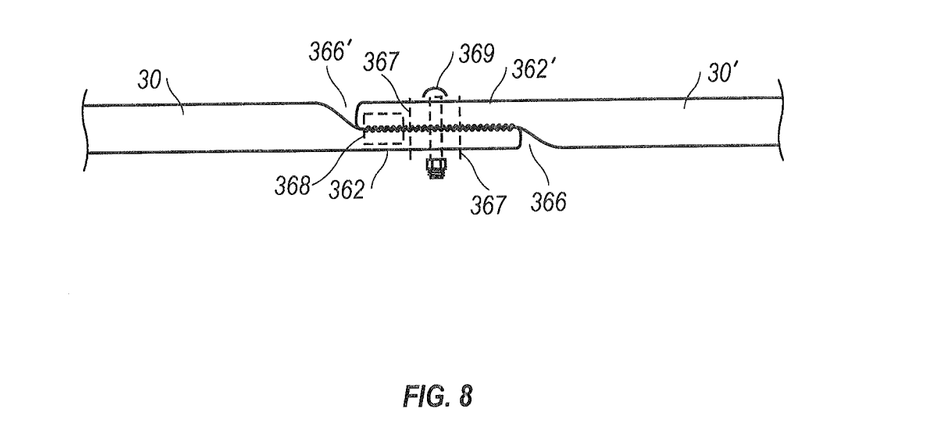
FIG. 8 is an elevation view of a preferred embodiment of an end lap coupling.

In a preferred embodiment, at least one end of the locking bar 30 terminates in a first shoulder 366 and a first cheek 362 to form an end lap 36 when coupled to a second locking bar 30' terminating at one end with a second shoulder 366' that opposes the first shoulder 366 and a second cheek 362' that opposes the first cheek 362. See FIGS. 5 through 8. In one embodiment, opposing surfaces of cheeks 362 and 362' are smooth. In another embodiment, at least a portion of each opposing surface of cheeks 362 and 362' are serrated to enhance coupling of end lap 36. See FIGS. 5 through 8. An end lap 36 of two locking bars 30 is fixed together by at least one pin 369 that passes through a passage 367 formed through cheeks 362 and 362'. See FIGS. 5, 6 and 8. In a preferred embodiment, passage 367 is a slot. See FIGS. 5, 7 and 8. In another preferred embodiment, a groove 364 is formed in each cheek 362 and 362' to receive a spline 368. See FIGS. 5 and 7. Spline 368 improves fixation between the first and second cheeks 362 and 362'. See FIGS. 5 and 8. It is further contemplated that pin 369 passes through groove 364 to restrict movement of spline 368 in groove 364. See FIGS. 5 and 8. Use of an end lap 36 creates a strong releaseable coupling between two locking bars 30 that is easy to manufacture, assemble and tear down.

Figure 4:
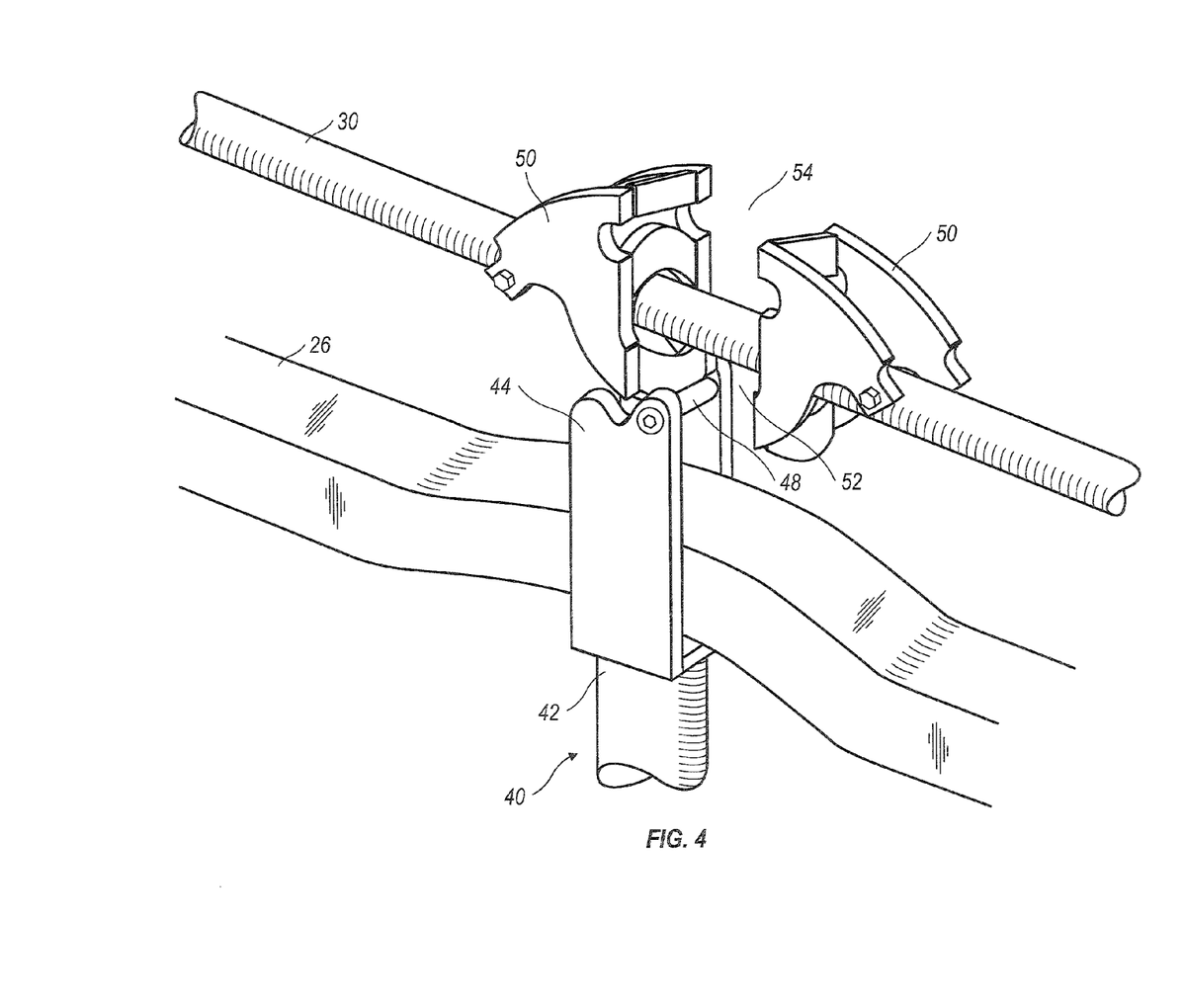
FIG. 4 is an exploded view of an improved livestock stanchion locking bar end lap coupling.

At least one pair of opposing latch dogs 50 are pivotally connected to the locking bar 30 to form at least one latching space 52 within a swing space 32 and at least one unlatching space 54 above the locking bar 30 when in a substantially vertical position. When a pair of opposing latch dogs 50 are in a substantially vertical position, latch dogs 50 are ready to receive and hold a latch pin 48 fixed to an upper region of a restraining stanchion 40. See FIGS. 1, 2 and 4. When a pair of opposing latch dogs 50 are in a substantially horizontal position, latch pin 48 is free to swing without engaging the opposing latch dogs 50. See FIG. 2.

The improve livestock stanchion 10 further comprises at least one stub 226 projecting outward from at least one tine 222 or 224. In a preferred embodiment, stub 226 projects outward from a bent tine 224. See FIG. 2. Stub 226 is coplanar with frame 20 and located above base rail 24. Stub 226 is pivotally fixed to at least one offset pivot member 46 extending away from at least one restraining stanchion 40. See FIGS. 1 and 2. A restraining stanchion 40 pivots between a first position 40a, a second position 40b and a third position 40c. In the first position 40a, a restraining stanchion 40 has a diagonal orientation across a livestock opening 28 with an upper region of the restraining stanchion 40 in close proximity to an upper end of a forked vertical post 22. See FIG. 1. In the second position 40b, a restraining stanchion 40 has a vertical to near vertical position which is generally parallel to a straight tine 222. See FIG. 1. In the third position 40c, a restraining stanchion 40 as a second diagonal orientation across a livestock opening 28 with an lower region of the restraining stanchion 40 in close proximity to a lower end of a forked vertical post 22. See FIG. 2. First position 40a is typically known as an "open" position, second position 40b is typically known as the "locked" position, and third position 40c is typically known as the "free" position. See FIGS. 1 and 2. The offset pivot member 46 locates the pivot point of a restraining stanchion 40 off its central longitudinal axis to a point beyond the surface of restraining stanchion 40. Use of forked vertical posts 22 of the present invention with an offset pivot member 46 causes each restraining stanchion 40 to lay over further when in the open position than current arrangements of restraining stanchions. This novel arrangement further allows earlier engagement of a latching mechanism, such as opposing latch dogs 50, when moving to a locked position 40*b* than current arrangements of restraining stanchions. Furthermore, this novel arrangement increases the size of the livestock opening 28 at an upper region.

In a preferred embodiment of the improved livestock stanchion, at least one latch pin 48 is fixed to an upper region 42 of a restraining stanchion 40 by at least one cheek plate 44 and further projects through a swing space 32 normal to the frame 20. See FIGS. 1, 2 and 4. At least one latch pin 48 is offset to a longitudinal axis of a restraining stanchion 40 away from the offset pivot member 46. See FIGS. 1 and 4. Use of an offset latch pin 48 as described above in a livestock stanchion promotes early engagement with a latching mechanism, such as a pair of latch dogs 50. Use of an offset latch pin 48 with offset pivot members 46 maximizes early engagement with a latching mechanism, such as a pair of latch dogs 50. In a preferred embodiment, an obstructing counterweight 49 is fixed to the lower end of a restraining stanchion 40 to counteract the weight of cheek plate(s) 44 and latch pin 48 and further obstruct the space below offset pivot member 46. See FIGS. 1 and 2.

A livestock stanchion and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A livestock stanchion comprising:
   a plurality of vertical posts fixed between a substantially horizontal base rail and a substantially horizontal slider rail to form an essentially co-planar frame having at least one livestock opening;
   a locking bar positioned horizontally and above said slider rail to form a swing space between said locking bar and said slider rail;
   at least one stub projecting outward from at least one of said vertical posts and coplanar with said frame and above said base rail and is pivotally fixed to at least one offset pivot member extending away from at least one restraining stanchion, wherein said at least one restraining stanchion pivots between an open position, a locked position and a free position in at least one said livestock opening;
   at least one latch pin fixed to an upper region of at least one said restraining stanchion, extending through said swing space normal to said frame and offset to a longitudinal axis of said at least one restraining stanchion, wherein said at least one latch pin and said offset pivot member are positioned diametrically opposite each other with respect to said longitudinal axis of said at least one restraining stanchion;
   at least one pair of opposing latch dogs pivotally connected to said locking bar to form at least one latching space within said swing space and at least one unlatching space above said locking bar when said at least one pair of opposing latch dogs are in a substantially vertical position.

2. A livestock stanchion as claimed in claim 1, wherein simultaneous enlargement of said at least one livestock opening and pivot of said at least one restraining stanchion occurs when said vertical posts comprise a straight tine and a bent tine wherein furcation of said tines is located at an upper region of a said vertical post and said slider rail has a serpentine form.

3. A livestock stanchion as claimed in claim 1, further comprising at least two releaseable support yokes holding said locking bar in said horizontal position, wherein said locking bar rotates about a longitudinal axis of said locking bar.

4. A livestock stanchion as claimed in claim 1, further comprising at least one end of said locking bar terminating in a first shoulder and a first cheek to form an end lap when coupled to a second locking bar terminating at one end with an opposing second shoulder and opposing second check and at least one pin passing through said first and second cheeks.

5. A livestock stanchion as claimed in claim 4, wherein at least a portion of each opposing surface of said first and second cheeks are serrated to enhance coupling of said end lap.

6. The livestock stanchion as claimed in claim 4, wherein a groove is formed in said at least a portion of each opposing surface of said first and second cheeks to hold a spline, wherein said groove is aligned with a longitudinal axis of said locking bar.

7. A livestock stanchion comprising:
   a plurality of vertical posts fixed between a substantially horizontal base rail and a substantially horizontal slider rail to form an essentially co-planar frame having at least one livestock opening;
   a locking bar resting horizontally in at least two releaseable support yokes mounted to said frame above said slider rail to form a swing space between said locking bar and said slider rail, wherein said support yokes are configured to allow said locking bar to rotate about a longitudinal axis of said locking bar;
   at least one end of said locking bar terminating in a first shoulder and first cheek to form an end lap when coupled to a second locking bar terminating at one end with an opposing second shoulder and opposing second cheek and at least one pin passing through said first and second cheeks;
   at least one restraining stanchion pivotally fixed to said at least one vertical post by at least one stub projecting away from said from said at least one vertical post, wherein said at least one restraining stanchion pivots between an open position, a locked position and a free position in at least one said livestock opening;
   at least one latch pin fixed to an upper region of at least one said restraining stanchion, extending through said swing space normal to said frame and offset to a longitudinal axis of said at least one restraining stanchion, wherein said longitudinal axis of said at least one restraining stanchion is located between said at least one latch pin and said at least one stub; and
   at least one pair of opposing latch dogs pivotally connected to said locking bar to form at least one latching space within said swing space and at least one unlatching space above said locking bar when said at least one pair of opposing latch dogs are in a substantially vertical position.

8. The livestock stanchion as claimed in claim 7, wherein said vertical posts comprise a straight tine and a bent tine wherein furcation of said tines is located at an upper region of a said vertical post; and said slider rail has a serpentine form to increase said at least one livestock opening.

9. The livestock stanchion as claimed in claim 8, wherein at least a portion of each opposing surface of said first and second cheeks are serrated to enhance coupling of said end lap.

10. The livestock stanchion as claimed in claim 8, wherein a groove is formed in said at least a portion of each opposing surface of said first and second cheeks to hold a spline.

11. The livestock stanchion as claimed in claim 7, further comprising at least one stub projecting outward from at least one vertical post and coplanar with said frame and above said base rail and is pivotally fixed to at least one offset pivot member extending away from said at least one restraining stanchion.

12. The livestock stanchion as claimed in claim 11, wherein at least a portion of each opposing surface of said first and second cheeks are serrated to enhance coupling of said end lap.

13. The livestock stanchion as claim in claim 11, wherein a groove is formed in said at least a portion of each opposing surface of said first and second cheeks to hold a spline, wherein said groove is aligned with a longitudinal axis of said locking bar.

14. The livestock stanchion as claimed in claim 7, wherein said longitudinal axis of said at least one restraining stanchion is the central longitudinal axis.

15. The livestock stanchion as claimed in claim 13, wherein at least a portion of each opposing surface of said first and second cheeks are serrated to enhance coupling of said end lap.

16. The livestock stanchion as claimed in claim 13, wherein a groove is formed in said at least a portion of each opposing surface of said first and second cheeks to hold a spline, wherein said groove is aligned with a longitudinal axis of said locking bar.

17. A livestock stanchion comprising:
   a plurality of forked vertical posts fixed between a substantially horizontal base rail and a substantially horizontal slider rail to form an essentially co-planar frame having at least one livestock opening; each of said forked vertical posts further comprise a straight tine and a bent tine wherein furcation of said tines is located at an upper region of a said forked vertical post;
   a locking bar resting horizontally in at least two releaseable support yokes mounted to said frame above said slider rail to form a swing space between said locking bar and said slider rail, wherein said support yokes are configured to allow said locking bar to rotate about a longitudinal axis of said locking bar;
   at least one stub projecting outward from at least one of said vertical posts and coplanar with said frame and above said base rail and is pivotally fixed to at least one offset pivot member extending away from at least one restraining stanchion, wherein said at least one restraining stanchion pivots between an open position, a locked position and a free position in at least one said livestock opening;
   at least one latch pin fixed to an upper region of at least one said restraining stanchion, extending through said swing space normal to said frame and offset to a longitudinal axis of said at least one restraining stanchion, wherein said at least one latch pin and said offset pivot member are opposably positioned across and offset from said longitudinal axis of said at least one restraining stanchion; and
   at least one pair of opposing latch dogs pivotally connected to said locking bar to form at least one latching space within said swing space and at least one unlatching space above said locking bar when said at least one pair of opposing latch dogs are in a substantially vertical position.

18. A livestock stanchion as claimed in claim 17, further comprising at least one end of said locking bar terminating in a first shoulder and a first cheek to form an end lap when coupled to a second locking bar terminating at one end with an opposing second shoulder and opposing second check and at least one pin passing through said first and second cheeks.

19. The livestock stanchion as claimed in claim 18, wherein at least a portion of each opposing surface of said first and second cheeks are serrated to enhance coupling of said end lap.

20. The livestock stanchion as claimed in claim 18, wherein a groove is formed in said at least a portion of each opposing surface of said first and second cheeks to hold a spline.

* * * * *